United States Patent
Zhang

(10) Patent No.: US 9,900,073 B2
(45) Date of Patent: Feb. 20, 2018

(54) CHANNEL STATE INFORMATION FEEDBACK METHODS AND DEVICES

(71) Applicant: Huawei Technologies Co., Ltd., Shenzhen, Guangdong (CN)

(72) Inventor: Yongping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 442 days.

(21) Appl. No.: 14/515,984

(22) Filed: Oct. 16, 2014

(65) Prior Publication Data

US 2015/0036529 A1 Feb. 5, 2015

Related U.S. Application Data

(63) Continuation of application No. PCT/CN2013/072107, filed on Mar. 4, 2013.

(30) Foreign Application Priority Data

Apr. 20, 2012 (CN) .......................... 2012 1 0118620

(51) Int. Cl.
*H04B 7/06* (2006.01)
*H04L 1/00* (2006.01)
*H04L 1/18* (2006.01)

(52) U.S. Cl.
CPC ......... *H04B 7/0626* (2013.01); *H04B 7/0636* (2013.01); *H04L 1/0026* (2013.01); *H04L 1/0029* (2013.01); *H04L 1/1829* (2013.01)

(58) Field of Classification Search
CPC ... H04L 1/0026; H04L 1/0029; H04B 7/0636; H04B 7/0626
See application file for complete search history.

(56) References Cited

U.S. PATENT DOCUMENTS 7,577,227 B2   8/2009   Budka et al.
7,746,802 B2   6/2010   Suh et al.
(Continued)

FOREIGN PATENT DOCUMENTS

CN   102082636 A   6/2011
CN   102088333 A   6/2011
(Continued)

OTHER PUBLICATIONS

Zhang et al., "Hybrid Transform Coding for Channel State Information in MIMO-OFDM Systems," 2011 IEEE International Conference on Communications, pp. 1-6, Institute of Electrical and Electronics Engineers, New York, New York, (Jun. 5-9, 2011).
(Continued)

*Primary Examiner* — Redentor Pasia
(74) *Attorney, Agent, or Firm* — Leydig, Voit & Mayer, Ltd.

(57) ABSTRACT

A CSI feedback method and device, including: acquiring a code identifier; acquiring a code parameter group corresponding to the code identifier from multiple preset code parameter groups; compressing an initial CSI according to the code parameter group to generate a compressed CSI, wherein the initial CSI is acquired by measuring a current downlink channel of a base station; and feeding back the compressed CSI to the base station, wherein the compressed CSI is used for reestablishment according to the code parameter group by the base station to obtain an initial CSI for next data sending of the base station. In the present invention, the precision of the CSI fed back by the UE may be adaptively modified according to the uplink and downlink communication conditions of the current base station, thus optimizing the data transmission capability of a system.

15 Claims, 2 Drawing Sheets

(56) References Cited

U.S. PATENT DOCUMENTS

| | | | |
|---|---|---|---|
| 2005/0265436 A1 | 12/2005 | Suh et al. | |
| 2009/0086845 A1* | 4/2009 | Demirhan | H04L 1/0003 375/295 |
| 2009/0204863 A1* | 8/2009 | Kim | H04L 1/0004 714/748 |
| 2010/0027696 A1* | 2/2010 | Lee | H04B 7/0452 375/260 |
| 2010/0172428 A1* | 7/2010 | Pani | H04L 1/0026 375/262 |
| 2010/0310000 A1* | 12/2010 | Ko | H04B 7/0617 375/260 |
| 2011/0021203 A1* | 1/2011 | Yamada | H04L 1/00 455/450 |
| 2011/0135021 A1 | 6/2011 | Hatakawa et al. | |
| 2011/0269490 A1* | 11/2011 | Earnshaw | H04L 1/0026 455/509 |
| 2011/0274053 A1* | 11/2011 | Baik | H04W 72/1242 370/329 |
| 2012/0033587 A1* | 2/2012 | Papasakellariou | H04J 13/00 370/277 |
| 2012/0039176 A1* | 2/2012 | Eshan | H04L 1/0002 370/237 |
| 2012/0087254 A1* | 4/2012 | Yin | H04L 1/0031 370/252 |
| 2012/0188899 A1 | 7/2012 | Zhang et al. | |
| 2012/0327875 A1* | 12/2012 | Han | H04L 27/2602 370/329 |
| 2013/0070720 A1 | 3/2013 | Pan et al. | |

FOREIGN PATENT DOCUMENTS

| | | |
|---|---|---|
| CN | 102104568 A | 6/2011 |
| CN | 102325013 A | 1/2012 |
| EP | 2302828 A1 | 3/2011 |
| WO | WO 2011038555 A1 | 4/2011 |
| WO | WO 2011041759 A1 | 4/2011 |
| WO | WO 2012028204 A1 | 3/2012 |

OTHER PUBLICATIONS

Ran et al., "Adaptive Feedback Algorithm for Multi-User MIMO System Based on HARQ," Journal of Beijing University of Posts and Telecommunications, vol. 33, No. 1, pp. 111-119, China Academy Journal Electronic Publishing House, Beijing, China (Feb. 2010).

"SU/MU MIMO Feedback with Codebook-Based Vector Quantization," 3GPP TSG RAN WG1 Meeting #58bis, Miyazaki, Japan, R1-094322, 3$^{rd}$ Generation Partnership Project, Valbonne, France (Oct. 12-16, 2009).

"Feedback Compression Methods and Their Performance Comparison," 3GPP TSG RAN1 #58bis, Miyazaki, Japan, R1-093961, 3$^{rd}$ Generation Partnership Project, Valbonne, France (Oct. 12-16, 2009).

Nguyen et al., "Feedback Compression Schemes for Downlink Carrier Aggregation in LTE-Advanced," IEEE Vehicular Technology Conference, pp. 1-5, Institute of Electrical and Electronics Engineers, New York, New York (2011).

* cited by examiner

CHANNEL STATE INFORMATION FEEDBACK METHODS AND DEVICES

CROSS-REFERENCE TO RELATED APPLICATIONS

This application is a continuation of International Patent Application No. PCT/CN2013/072107, filed on Mar. 4, 2013, which claims priority to Chinese Patent Application No. 201210118620.6, filed on Apr. 20, 2012, both of which are hereby incorporated by reference in their entireties.

TECHNICAL FIELD

The present invention belongs to the technical field of communications, and particularly, relates to channel state information (Channel State Information, CSI) feedback methods and devices.

BACKGROUND

A multiple-input multiple-output (Multiple-Input Multiple-Output, MIMO) system greatly improves a data transmission rate of a wireless communication system through configuring multiple antennas at a transmitting end and a receiving end of a base station respectively, and has been adopted by a series of wireless standards, such as a long term evolution (Long Term Evolution, LTE), a long term evolution-advanced (Long Term Evolution-Advanced, LTE-A) and the like. The performance of the above-mentioned wireless communication system is further improved by adopting some advanced MIMO technologies.

Taking a multi-user MIMO (Multi-User MIMO, MU-MIMO) technology as an example, the base station provides services for multiple UEs by using different beams formed on an antenna array. In the above-mentioned process, the base station needs to acquire a CSI of a downlink channel between the base station and each UE, so as to adjust the beams and schedule transmitting. The above-mentioned CSI is fed back by the UE served by the base station through an uplink channel of the base station. The more precise the fed-back CSI is, and the higher the promotion of the performance of the downlink channel is, which means that more uplink overhead is needed to feed back the CSI with high precision, so the fed-back CSI needs to be compressed and coded to reduce the uplink overhead.

The CSI is transformed from a frequency domain to a time domain for compressing and coding in the prior art. However, related parameters of a coding mode of the CSI are preset. Once the parameters are set, in a relatively long communication process, even if the fed-back CSI is distorted seriously after reestablishment to cause decline of the downlink performance of the base station, the precision of the fed-back CSI is not modified anymore, so that the feedback overhead brought by the CSI is not modified any more in this communication process. Under the above-mentioned condition, when the uplink channel state of the base station is relatively good and more data may be transmitted, the precision of the CSI cannot be improved through improving the feedback overhead to improve the downlink performance of the base station; when the uplink channel state of the base station is relatively poor, maintenance of the original feedback overhead may exceed the uplink channel load of the base station, so that a large amount of error codes appear in the feedback process, and the base station can not accurately reestablish the compressed CSI, thus correspondingly causing decline of the downlink performance of the base station.

SUMMARY

One objective of embodiments of the present invention is to provide a CSI feedback method, so that the precision of a CSI fed back by UE in an MIMO system may be adaptively adjusted according to changes of the downlink performance and the uplink channel state of a base station.

The embodiments of the present invention are realized in this way, a CSI feedback method is characterized by including:

acquiring a code identifier, wherein the code identifier is determined according to at least one of HARQ information and a current uplink channel state of a base station, and the HARQ information is acquired according to a current data receiving result of UE;

acquiring a code parameter group corresponding to the code identifier from multiple preset code parameter groups;

compressing an initial CSI according to the code parameter group to generate a compressed CSI, wherein the initial CSI is acquired by measuring a current downlink channel of the base station; and feeding back the compressed CSI to the base station, wherein the compressed CSI is used for reestablishment according to the code parameter group by the base station to obtain an initial CSI for next data sending of the base station.

Another objective of the embodiments of the present invention is to provide a CSI feedback method, including:

acquiring a code identifier, wherein the code identifier is determined according to at least one of HARQ information and a current uplink channel state of a base station, and the HARQ information is acquired by a UE according to a current data receiving result;

receiving a compressed CSI sent by the UE;

acquiring a code parameter group corresponding to the code identifier from multiple preset code parameter groups; and reestablishing the compressed CSI according to the code parameter group to obtain an initial CSI for next data sending of the base station.

Yet another objective of the embodiments of the present invention is to provide a CSI feedback device, which is located at a UE and includes:

a first code identifier acquiring unit, configured to acquire a code identifier, wherein the code identifier is determined according to at least one of HARQ information and a current uplink channel state of a base station, and the HARQ information is acquired according to a current data receiving result of the UE;

a first code parameter group acquiring unit, configured to acquire a code parameter group corresponding to the code identifier from multiple preset code parameter groups;

a CSI compressing unit, configured to compress an initial CSI according to the code parameter group to generate a compressed CSI, wherein the initial CSI is acquired by measuring a current downlink channel of the base station; and a CSI feedback unit, configured to feed back the compressed CSI to the base station, wherein the compressed CSI is used for reestablishment according to the code parameter group by the base station to obtain an initial CSI for next data sending of the base station.

Yet another objective of the embodiments of the present invention is to provide a CSI feedback device, which is located at a base station and includes:

a second code identifier acquiring unit, configured to acquire a code identifier, wherein the code identifier is determined according to at least one of HARQ information and a current uplink channel state of the base station, and the HARQ information is acquired by a UE according to a current data receiving result;

a CSI receiving unit, configured to receive a compressed CSI sent by the UE;

a second code parameter group acquiring unit, configured to acquire a code parameter group corresponding to the code identifier from multiple preset code parameter groups; and a CSI reestablishing unit, configured to reestablish the compressed CSI according to the code parameter group to obtain an initial CSI for next data sending of the base station.

In the embodiments of the present invention, based on a wireless communication system adopting an MIMO technology, the coding mode of the CSI fed back to the base station by the UE is adjusted in real time according to the downlink performance of the current base station and the state of an uplink channel from the base station to the UE, so that the precision of the CSI fed back by the UE may be adaptively modified according to the uplink and downlink communication conditions of the current base station, thus optimizing the data transmission capability of the system.

DESCRIPTION OF EMBODIMENTS

To make the objectives, technical solutions and advantages of the present invention clearer, the present invention is further illustrated in detail below, in combination with the accompanying drawings and embodiments. It should be understood that the specific embodiments described herein are merely used for interpreting the present invention, rather than limiting the present invention.

In the embodiments of the present invention, based on a wireless communication system adopting an MIMO technology, the coding mode of a CSI fed back to a base station by UE is adjusted in real time according to the downlink performance of the current base station and the state of an uplink channel from the base station to the UE, so that the precision of a CSI fed back by the UE may be adaptively modified according to the uplink and downlink communication conditions of the current base station, thus optimizing the data transmission capability of the system.

Figure 1:
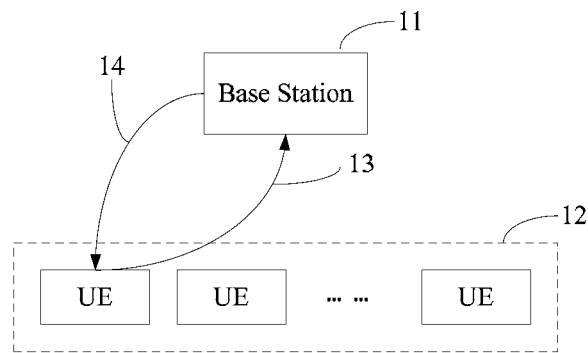
FIG. 1 is a scenario schematic diagram of a system applicable to a CSI feedback method provided in an embodiment of the present invention.

FIG. 1 shows a scenario schematic diagram of a system applicable to a CSI feedback method provided in an embodiment of the present invention. To illustrate conveniently, merely a part related to this embodiment is shown.

Referring to FIG. 1, the system may be a wireless communication system adopting an MIMO technology, wherein, a base station 11 simultaneously serves one or more UEs 12 by using different beams formed on an antenna array of the base station. Each UE 12 feeds back a compressed CSI through an uplink channel 13 of the base station, and the base station 11 reestablishes the CSI fed back to the base station 11 by each UE 12 to adjust beam formation, thus completing transmission scheduling on a downlink channel 14.

A CSI feedback method under the scenario of the system shown in FIG. 1 is illustrated in detail below.

Figure 2:
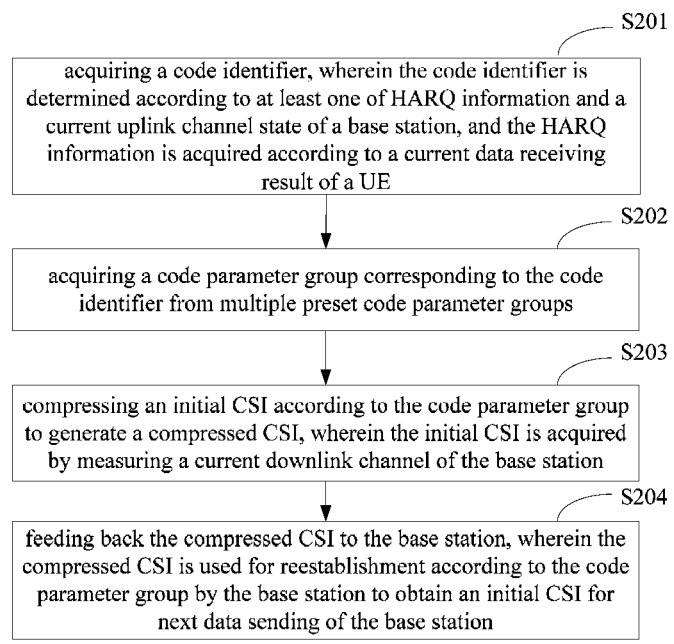
FIG. 2 is an implementation flow diagram of a CSI feedback method provided in an embodiment of the present invention at a UE side.

FIG. 2 shows an implementation flow of a CSI feedback method provided in an embodiment of the present invention. In this embodiment, the execution main body of the flow is one UE 12 in FIG. 1, and the detailed description is as follows.

In step S201, a code identifier is acquired, wherein the code identifier is determined according to at least one of hybrid automatic repeat request (Hybrid Automatic Repeat reQuest, HARQ) information and a current uplink channel state of a base station, and the HARQ information is acquired according to a current data receiving result of the UE.

In step S202, a code parameter group corresponding to the code identifier is acquired from multiple preset code parameter groups.

In this embodiment, all the code parameter groups probably involved in compressed coding performed on a CSI by the UE in the CSI feedback process are preset according to a protocol or a system environment at the base station side and the UE side, each code parameter group includes multiple code parameters, which correspond to one compressed coding mode. Namely the UE may determine the coding mode used for compressed coding of the CSI according to the code parameters included in each code parameter group. Wherein, the code parameters include but not limited to:

coding mode: direct coding, differential coding and the like;

compression quantization codebook type: codebook length, high-precision codebook, low-precision codebook and the like;

and number of feedback paths, whether feeding back the time delay of paths or not, and the like.

Each code parameter group corresponds to one unique code identifier in this embodiment, for example, if a code of 2 bit is used as a code identifier, different code identifiers may be in one-to-one correspondence to 4 code parameter groups. The UE may determine a compressed coding mode of a CSI by acquiring one code identifier and configuring the code parameter group corresponding to the code identifier in the multiple preset code parameter groups according to the code identifier.

As an embodiment of the present invention, the code identifier is determined by the base station and then sent to the UE. In this embodiment, the UE feeds back the acquired HARQ information to the base station, and the base station performs comprehensive judgment according to at least one of the fed-back HARQ information and the current uplink channel state of the base station and configures the corresponding code identifier according to a preset judgment mode. In this embodiment, the code identifier is sent to the UE by the base station in a mode of downlink signaling.

For the HARQ information, after the UE receives data sent by the base station at this time, correspondingly, the UE could feed back the HARQ information generated according to a data receiving result at this time to the base station. When the fed-back HARQ information is negative acknowledgement (NACK), the data receiving result at this time is inaccurate, namely a transmitting parameter used by the base station is not matched with a downlink channel, so that the communication quality declines; and when the fed-back HARQ information is acknowledgement (ACK), the data receiving result at this time is accurate, namely the transmitting parameter used by the base station is well matched with the downlink channel, so that the communication quality is correspondingly good.

It should be noted that when the base station sends the code identifier, a default code parameter group may be preset in all the code parameter groups; and if the UE does not receive the code identifier from the base station in the beginning of communication or in the communication process, the CSI may be directly compressed and then fed back according to the code parameter group. Under the above-mentioned condition, the base station may also compress and then feed back the CSI by using the code parameter group used for last compression.

Preferably, when the base station sends the code identifier, the base station may determine whether the code identifier is sent at this time before sending by detecting whether the current code identifier is the same as a code identifier sent last time, and if the current code identifier is different from the code identifier sent last time, the base station sends the current code identifier to the UE. In this embodiment, if the UE does not receive the code identifier sent by the base station, the UE may encode the CSI according to the default code parameter group or maintain the original code parameter group to encode the CSI.

Further, preferably, under the condition that the code identifier needs to be acquired according to the HARQ information, when the base station sends the code identifier to the UE merely when the current code identifier is different from the code identifier sent last time, the base station may smoothly filter the HARQ information and then judge sending of the code identifier, and this method may prevent the base station from frequently sending the updated code identifier to the UE. For example, when merely one of ten data is received in error, it does not represent that the downlink performance of the base station is changed at this moment, and the condition of the data receiving error is ignored through smooth filtering to prevent the base station from frequently sending the code identifier.

In this embodiment, the base station determines the corresponding code identifier, and the UE directly acquires the determined code identifier, so that the work load at the UE side is correspondingly reduced.

As an embodiment of the present invention, the code identifier may also be automatically determined by the UE. In this embodiment, the UE performs comprehensive judgment according to at least one of the acquired HARQ information and the uplink channel state and configures the corresponding code identifier according to the preset judgment mode, wherein, the uplink channel state herein may be judged by the UE through modulation coding schemes (Modulation Coding Schemes, MCS) in the recently received scheduling information from the base station, and when the MCS received by the UE recently corresponds to high order modulation and high code rate, the uplink channel state is relatively good at this moment, otherwise, the uplink channel state is relatively poor.

In this embodiment, the corresponding code identifier is determined by the UE, rather than being sent by the base station, so that the downlink overhead of the base station is reduced to a certain extent.

No matter the corresponding code identifier is determined by the base station or the UE, the process of configuring the code identifier according to the HARQ information and the current uplink channel state of the base station may consult the following principles:

1, when the fed-back HARQ information is NACK, the precision of the coding mode used by the UE and used for CSI compression is not good enough at this moment, and the precision of the fed-back CSI should be correspondingly improved to improve the downlink performance of the base station. At this moment, if the uplink channel state of the base station is relatively good and more data may be transmitted, the corresponding code identifier may be selected and configured to improve the feedback precision of the CSI;

2, when the fed-back HARQ information is NACK, at this moment, if the uplink channel state of the base station is relatively poor and the transmission load is relatively heavy, the corresponding code identifier may be configured, to correspondingly reduce or improve the feedback precision of the CSI according to actual needs of the system;

3, when the fed-back HARQ information is ACK, the precision of the coding mode used by the UE and used for CSI compression is good enough, at this moment, if the uplink channel state of the base station is relatively poor, the configured code identifier enables the precision of the fed-back CSI to be correspondingly reduced, and the transmission load of the uplink channel of the base station is lightened on the premise that the downlink performance of the base station is not affected;

4, when the fed-back HARQ information is ACK, at this moment, if the uplink channel state of the base station is relatively good, the corresponding code identifier may be configured, to correspondingly reduce or improve the feedback precision of the CSI according to actual needs of the system.

The foregoing descriptions merely list several configuration principles of the code identifier. Obviously, in the actual configuration process, the corresponding code identifier may also be acquired merely according to the HARQ information or merely according to the current uplink channel state of the base station, and the actual configuration process is not limited to the above-mentioned principles, which is not limited in this embodiment or described redundantly herein.

In step S203, an initial CSI is compressed according to the code parameter group to generate a compressed CSI, wherein the initial CSI is acquired by measuring the current downlink channel of the base station.

In step S204, the compressed CSI is fed back to the base station, wherein the compressed CSI is used for reestablishment according to the code parameter group by the base station to obtain an initial CSI for next data sending of the base station.

In this embodiment, the UE makes a channel estimation by receiving a reference signal transmitted by the base station at a foreknown position to acquire the current initial CSI, performs compressed coding on the initial CSI through the code parameter group corresponding to the acquired code identifier to generate the compressed CSI, and feeds back the compressed CSI to the base station, so that the base station reestablishes the compressed CSI according to the same code parameter group to obtain the initial CSI, and the reestablished initial CSI is used for next data sending.

It should be noted that when the corresponding code identifier is determined by the UE, the UE needs to send the compressed CSI and the determined code identifier at the same time, so that the base station determines the corresponding code parameter group in the multiple code parameter groups preset at the base station end according to the code identifier.

In this embodiment, the coding mode of the CSI fed back to the base station by the UE is adjusted in real time according to the downlink performance of the current base station and the state of the uplink channel from the base station to the UE, so that the precision of the CSI fed back by the UE may be adaptively modified according to the uplink and downlink communication conditions of the current base station, thus optimizing the data transmission capability of the system.

Figure 3:
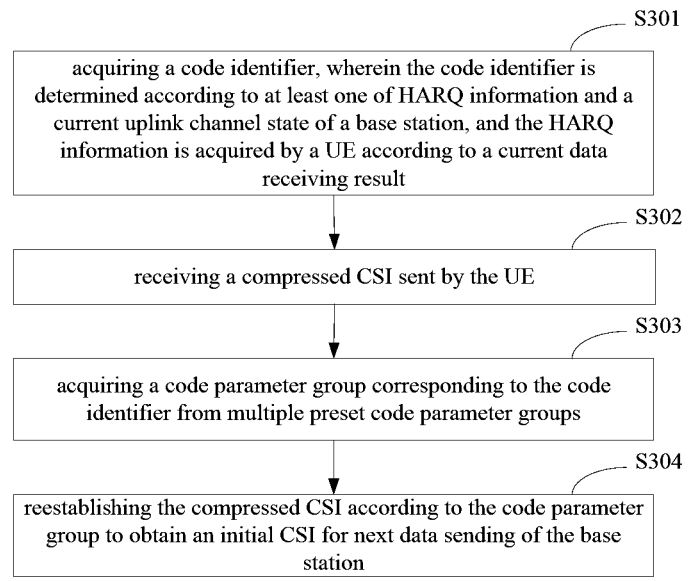
FIG. 3 is an implementation flow diagram of a CSI feedback method provided in an embodiment of the present invention at a base station side.

FIG. 3 shows an implementation flow of a CSI feedback method provided in an embodiment of the present invention. In this embodiment, the execution main body of the flow is the base station 11 in FIG. 1, and the detailed description is as follows:

In step S301, a code identifier is acquired, wherein the code identifier is determined according to at least one of HARQ information and a current uplink channel state of the base station, and the HARQ information is acquired by a UE according to a current data receiving result.

Step S301 may be executed in two modes:

As one embodiment of the present invention, the code identifier is determined by the base station and then sent to the UE. The UE feeds back the acquired HARQ information to the base station, and the base station performs comprehensive judgment according to at least one of the fed-back HARQ information and the current uplink channel state of the base station, configures the corresponding code identifier according to a preset judgment mode and sends the code identifier to the UE in a mode of downlink signaling.

As another embodiment of the present invention, the code identifier may also be automatically determined by the UE and then fed back to the base station, and the UE may feed back the CSI and carry the code identifier to feed it back to the base station at the same time. The UE performs comprehensive judgment according to at least one of the acquired HARQ information and the uplink channel state and configures the corresponding code identifier according to the preset judgment mode, wherein, the uplink channel state herein may be judged by the UE through MCS in the recently received scheduling information from the base station, and when the MCS received by the UE recently corresponds to high order modulation and high code rate, the uplink channel state is relatively good at this moment, otherwise, the uplink channel state is relatively poor.

The specific code identifier acquiring principles have been illustrated in detail in the embodiment shown in FIG. 2 in the present invention, so they are not described redundantly herein.

In step S302, a compressed CSI sent by the UE is received.

In step S303, a code parameter group corresponding to the code identifier is acquired from multiple preset code parameter groups.

In this embodiment, all the code parameter groups are preset in the base station likewise, and the code parameter group corresponding to the code identifier may be acquired from the multiple preset code parameter groups according to the acquired code identifier.

In step S304, the CSI is reestablished according to the code parameter group to obtain an initial CSI for next data sending of the base station.

Because the implementation principle of this embodiment is consistent with that of the embodiment shown in FIG. 2 in the present invention, it is not described redundantly herein.

Figure 4:
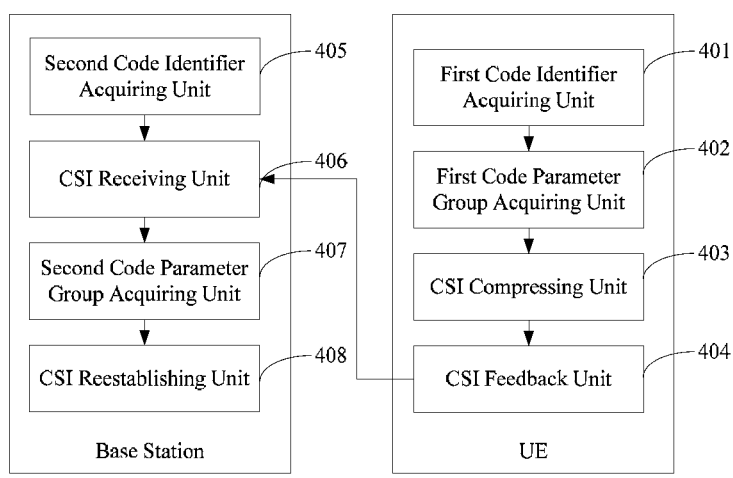
FIG. 4 is a structural block diagram of a CSI feedback device provided in an embodiment of the present invention.

FIG. 4 shows a structural block diagram of a CSI feedback device provided in an embodiment of the present invention. The device shown in this embodiment is used for implementing the CSI feedback methods illustrated in the embodiments of FIG. 2 and FIG. 3 in the present invention, and in order to illustrate conveniently, merely a part related to this embodiment is shown.

Referring to FIG. 4, in a UE, the device may be a processor and includes:

a first code identifier acquiring unit 401, configured to acquire a code identifier, wherein the code identifier is determined according to at least one of HARQ information and the current uplink channel state of a base station, and the HARQ information is acquired according to a current data receiving result of the UE;

a first code parameter group acquiring unit 402, configured to acquire a code parameter group corresponding to the code identifier from multiple preset code parameter groups;

a CSI compressing unit 403, configured to compress an initial CSI according to the code parameter group to generate a compressed CSI, wherein the initial CSI is acquired by measuring the current downlink channel of the base station; and a CSI feedback unit 404, configured to feed back the compressed CSI to the base station, wherein the compressed CSI is used for reestablishment according to the code parameter group by the base station to obtain an initial CSI for next data sending of the base station.

As one embodiment of the present invention, the first code identifier acquiring unit 401 includes:

an HARQ information acquiring subunit, configured to acquire the HARQ information according to the current data receiving result;

an HARQ information feedback subunit, configured to feed back the HARQ information to the base station; and a code identifier receiving subunit, configured to receive the code identifier determined by the base station according to the HARQ information and the current uplink channel state of the base station.

In this embodiment, when the CSI compressing unit 403 does not acquire the code identifier, the CSI compressing unit 403 compresses the initial CSI according to the pre-assigned code parameter group or the code parameter group used for last compression.

Further, the device also includes:

a smooth filtering unit, configured to smoothly filter the HARQ information, so as to prevent the base station from sending the updated code identifier.

As another embodiment of the present invention, the first code identifier acquiring unit 401 includes:

an HARQ information acquiring subunit, configured to acquire the HARQ information according to the current data receiving result;

an uplink channel state acquiring subunit, configured to acquire the current uplink channel state of the base station according to scheduling information of the base station; and a first code identifier determining subunit, configured to determine the code identifier according to the HARQ information and the current uplink channel state of the base station.

In a base station, the device may be a processor and includes:

a second code identifier acquiring unit 405, configured to acquire a code identifier, wherein the code identifier is determined according to at least one of HARQ information and the current uplink channel state of the base station, and the HARQ information is acquired by a UE according to a current data receiving result;

a CSI receiving unit 406, configured to receive a compressed CSI sent by the UE;

a second code parameter group acquiring unit 407, configured to acquire a code parameter group corresponding to the code identifier from multiple preset code parameter groups; and a CSI reestablishing unit 408, configured to reestablish the compressed CSI according to the code parameter group to obtain an initial CSI for next data sending of the base station.

As one embodiment of the present invention, the second code identifier acquiring unit 405 includes:

an HARQ information receiving subunit, configured to receive the HARQ information fed back by the UE;

a second code identifier determining subunit, configured to determine the code identifier according to the HARQ information and the current uplink channel state of the base station; and a code identifier sending subunit, configured to send the code identifier to the UE.

Further, the second code identifier acquiring unit 405 also includes:

a code identifier sending subunit, configured to detect whether the code identifier is the same as a code identifier sent last time, and send the code identifier to the UE if the code identifier is different from the code identifier sent last time.

As the other embodiment of the present invention, the second code identifier acquiring unit 405 is configured to receive the code identifier determined by the UE according to the HARQ information and the current uplink channel state of the base station.

In the embodiment of the present invention, the coding mode of the CSI fed back to the base station by the UE is adjusted in real time according to the downlink performance of the current base station and the state of the uplink channel from the base station to the UE, so that the precision of the CSI fed back by the UE may be adaptively modified according to the uplink and downlink communication conditions of the current base station, thus optimizing the data transmission capability of the system.

The foregoing descriptions are merely preferred embodiments of the present invention, rather than limiting the present invention. Any modifications, equivalent substitutions, improvements and the like made within the spirit and principle of the present invention should be included in the protection scope of the present invention.

What is claimed is:

1. A channel state information (CSI) feedback method, comprising:
    generating a compressed CSI by compressing an initial CSI, wherein the initial CSI is acquired by measuring a current downlink channel of a base station; and
    providing the compressed CSI to the base station, wherein the compressed CSI is used for reestablishment according to a code parameter group by the base station to obtain an initial CSI for a subsequent transmission of the base station,
    wherein generating a compressed CSI by compressing an initial CSI comprises:
    compressing the initial CSI according to an acquired code parameter group corresponding to an acquired code identifier;
    wherein the acquired code identifier is determined according to both of: (a) hybrid automatic repeat request (HARQ) information acquired according to a current data receiving result of a user equipment (UE), and (b) a current uplink channel state of the base station, and
    wherein the acquired code parameter group is acquired, from multiple preset code parameter groups, according to the acquired code identifier.

2. The method according to claim 1, wherein the acquired code identifier is acquired by:
    acquiring the HARQ information according to the current data receiving result;
    feeding back the HARQ information to the base station; and
    receiving the acquired code identifier determined by the base station according to the HARQ information and the current uplink channel state of the base station.

3. The method according to claim 1, wherein acquiring the code identifier comprises:
    acquiring the HARQ information according to the current data receiving result;
    acquiring the current uplink channel state of the base station according to scheduling information from the base station; and
    determining the acquired code identifier according to the HARQ information and the current uplink channel state of the base station.

4. A channel state information (CSI) feedback method, comprising:
    acquiring a code identifier determined according to both of: (a) hybrid automatic repeat request (HARQ) information acquired by a user equipment (UE) according to a current data receiving result, and (b) a current uplink channel state of a base station;
    receiving a compressed CSI sent by the UE;
    acquiring a code parameter group, from multiple preset code parameter groups, corresponding to the code identifier; and
    reestablishing the compressed CSI according to the code parameter group to obtain an initial CSI for next data sending of the base station.

5. The method according to claim 4, wherein the acquiring a code identifier comprises:
    receiving the HARQ information fed back by the UE; and
    determining the code identifier according to the HARQ information and the current uplink channel state of the base station.

6. The method according to claim 5, further comprising:
    detecting whether the code identifier is the same as a previously transmitted code identifier; and
    sending the code identifier to the UE if the code identifier is different than the previously transmitted code identifier.

7. The method according to claim 4, wherein the acquiring a code identifier comprises:
    receiving the code identifier determined by the UE according to the HARQ information and the current uplink channel state of the base station.

8. A channel state information (CSI) feedback device located at a user equipment (UE), the CSI feedback device comprising:
    a processor; and
    a non-transitory computer-readable storage medium including computer-executable instructions executed by the computing hardware to perform, on the user equipment, a method comprising:

acquiring a code identifier, determined according to both of: (a) hybrid automatic repeat request (HARQ) information acquired according to a current data receiving result of the UE, and (b) a current uplink channel state of a base station;

acquiring, from multiple preset code parameter groups, a code parameter group corresponding to the code identifier;

compressing an initial CSI according to the code parameter group to generate a compressed CSI, wherein the initial CSI is acquired by measuring a current downlink channel of the base station; and providing the compressed CSI through a transmitter of the UE to the base station as feedback, wherein the compressed CSI is used for reestablishment according to the code parameter group by the base station to obtain an initial CSI for a subsequent transmission of the base station.

9. The device according to claim 8, wherein the non-transitory computer-readable storage medium further comprises computer-executable instructions for:

acquiring, according to the current data receiving result, the HARQ information;

providing the HARQ information to the base station as feedback; and receiving the code identifier determined by the base station according to the HARQ information and the current uplink channel state of the base station.

10. The device according to claim 9, wherein the non-transitory computer-readable storage medium further comprises computer-executable instructions for: if the code identifier is not acquired, compressing the initial CSI according to one of a pre-assigned code parameter group and a code parameter group previously used for compression.

11. The device according to claim 8, wherein the non-transitory computer-readable storage medium further comprises computer-executable instructions for:

acquiring the HARQ information according to the current data receiving result;

acquiring the current uplink channel state of the base station according to scheduling information of the base station; and determining the code identifier according to the HARQ information and the current uplink channel state of the base station.

12. A channel state information (CSI) feedback device located at a base station, the CSI feedback device comprising:

a processor; and a non-transitory computer-readable storage medium including computer-executable instructions executed by the processor to perform, on the base station, a method comprising:

acquiring a code identifier according to both of: (a) hybrid automatic repeat request (HARQ) information acquired by a user equipment (UE) according to a current data receiving result, and (b) a current uplink channel state of the base station;

receiving a compressed CSI through a receiver of the base station from UE;

acquiring, from multiple preset code parameter groups, a code parameter group corresponding to the code identifier; and reestablishing the compressed CSI according to the code parameter group to obtain an initial CSI for a subsequent data transmission of the base station.

13. The device according to claim 12, wherein the non-transitory computer-readable storage medium further comprises computer-executable instructions for:

receiving the HARQ information provided by the UE; and determining the code identifier according to the HARQ information and the current uplink channel state of the base station.

14. The device according to claim 13, wherein the non-transitory computer-readable storage medium further comprises computer-executable instructions for:

detecting whether the code identifier is the same as a previously transmitted code identifier, and to send the code identifier to the UE if the code identifier is different than the previously transmitted code identifier.

15. The device according to claim 12, wherein the non-transitory computer-readable storage medium further comprises computer-executable instructions for receiving the code identifier determined by the UE according to the HARQ information and the current uplink channel state of the base station.

* * * * *